United States Patent [19]

Gutknecht

[11] 4,206,010

[45] Jun. 3, 1980

[54] DRUM TO BUILD AND FORM A BELT TIRE

[75] Inventor: Heinz Gutknecht, Epe, Netherlands

[73] Assignee: VMI-Epe-Holland B.V., Epe, Netherlands

[21] Appl. No.: 925,593

[22] Filed: Jul. 17, 1978

[51] Int. Cl.² .................................................. B29H 17/16
[52] U.S. Cl. ..................................... 156/415; 156/132; 156/401; 156/416
[58] Field of Search ............... 156/394, 401, 414, 415, 156/416, 417, 132

[56] References Cited

U.S. PATENT DOCUMENTS

| | | | |
|---|---|---|---|
| 3,160,545 | 12/1964 | Burton | 156/416 |
| 3,518,149 | 6/1970 | Mirtain | 156/416 |
| 3,816,218 | 6/1974 | Felton | 156/416 |
| 3,853,653 | 12/1974 | Olbert et al. | 156/401 X |
| 4,011,126 | 3/1977 | Eichholz et al. | 156/416 |
| 4,080,310 | 3/1978 | Shickman | 156/401 X |
| 4,087,305 | 5/1978 | Touchette et al. | 156/401 |

FOREIGN PATENT DOCUMENTS 2134904  1/1973  Fed. Rep. of Germany .
1395359  5/1975  United Kingdom .

*Primary Examiner*—John E. Kittle
*Attorney, Agent, or Firm*—Ladas, Parry, Von Gehr, Goldsmith & Deschamps

[57] ABSTRACT

A drum to build and form a belted tire, having a central support element, the central portion of which consists of radially slidable segments, and two bead retainers arranged at both sides of said support element, the spacing of said bead retainers being axially adjustable symmetrically with respect to the support element, the bead retainers having, at their circumference, radially expandable, integrally formed rings arranged to be brought into engagement with the tire in an air-tight manner, wherein the support element has an integrally formed rigid cases between the central portion and the bead retainers, the rigid cases being fixedly connected to the side of the bead retainers facing the central portion, the contact face of each rigid case facing the central portion being bevelled, the segments of the central portion which are arranged between the two cases engage the bevelled contact faces of the cases, are retained by springs and are similarly bevelled at the place of contact with the cases, whereby when the distance between the bead retainers and the distance between the cases is decreased, the segments automatically extend radially outwardly and the cases slide underneath the segments and wherein the side of the ring facing the tire bead is cylindrical.

9 Claims, 5 Drawing Figures

DRUM TO BUILD AND FORM A BELT TIRE

The present invention relates to a drum to build and form a belted tire.

In the building of a tire the procedure generally comprises forming one or more cord plies into a cylindrical body on a tire building drum. This body is then given a toric shape either in an expanding apparatus or in a tire heating press. In the manufacture of radial-ply tires it is usually necessary to carry out the expanding operation before introduction into a tire heating press, since a belt must previously be fastened to the tire blank.

From German Auslegeschrift No. 2,134,904 a device is known, in which the drum consists of the bead retainer means and an extension drum connected at least to the exterior of at least one bead retainer means. First when the drum is rotating a tire is laid up and secured, after this the bead retainer means are moved away from each other until the edges of the tire have the required position relative to the ring grooves. Then the tire is released and bead cores are brought over the ring grooves and the bead retainer means move toward each other, while a pressurized medium is supplied into the clearance. The drum is then rotated again and the ends of the carcass over the bead cores folded backwards by means of compression rolls. Such a device has the considerable disadvantages that the carcass will show an uncontrollable sag under the influence of gravity, so that it is almost impossible to manufacture a tire for private cars. In fact it is only possible to manufacture a truck tire which is stable by itself. A further disadvantage is that the carcass has to be shifted along the connection drum with a consequence that friction will increase and the extension drums will therefore have to be cleaned often. The same applies to the compression rolls, be it to a somewhat less extent. The compression rolls also show the disadvantage that they fold the cord webs backwards only partially, which is not favourable in principle for a uniform backward folding operation.

An object of the invention is to provide an improved device of the above-described type such that the said problems and disadvantages are overcome.

According to the present invention there is provided a drum to build and form a belted tire, provided with a central support element, the central portion of which consists of radially slidable segments, and two bead retainer means arranged one at each side of said support element, the spacing of said bead retainer means being axially adjustable symmetrically with respect to the support element, the bead retainer means having at their circumference radially expandable, integrally formed rings adapted to be brought into engagement with the tire in an air-tight manner, wherein the support element has an integrally formed rigid case between the central portion and the bead retainer means, the rigid case being fixedly connected to the side of the bead retainer means facing the central portion, the contact face of each rigid case facing the central portion being bevelled, the segments of the central portion which are arranged between the two cases engage the bevelled contact faces of the cases, are retained by means of springs and are similarly bevelled at the place of contact with the cases, whereby when the distance between the bead retainer means and the distance between the cases is decreased, the segments automatically extend radially outwardly and the cases slide underneath the segments and wherein the side of the ring facing the tire bead is cylindrical.

Preferably six radially displaceable segments are provided which are screwed onto blocks and are resiliently arranged within bores in the support element. This provides a simple possibility to rebuild the drum for another size of tire.

To provide proper sealing it is furthermore suggested according to the present patent application that the ring piece, within the bead retainer means, of the radially expandable elements be divided by introducing a series of ring pieces therebetween. The ring pieces consisting preferably of a plastics material, for instance nylon.

The invention will be further elucidated hereinafter on the basis of the drawings, in which by way of example an embodiment of a tire drum according to the present invention is shown.

FIG. 5 shows the same as FIG. 1 but in the inwardly moved condition.

Figure 1:
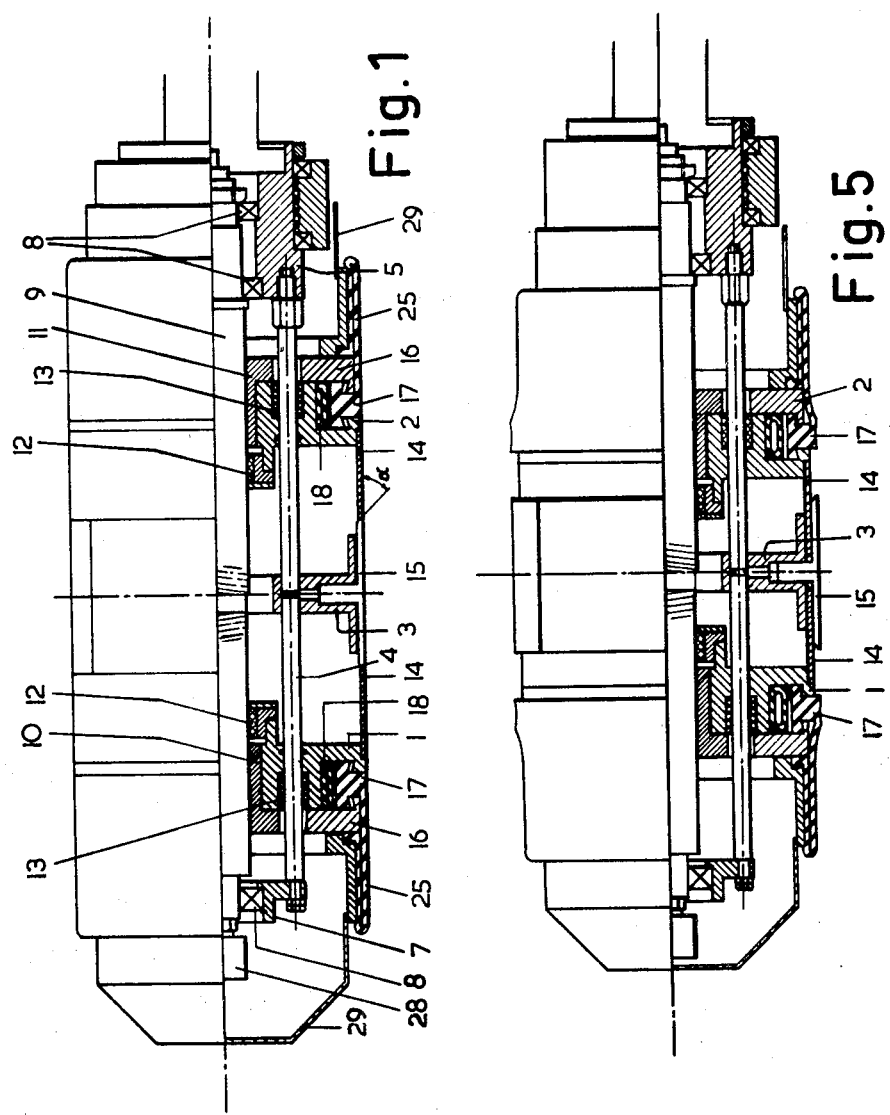
FIG. 1 shows an axial cross-section through a drum in the spaced-apart condition.

The main portions of the drum are a first bead retainer means 1, a second bead retainer means 2, and a support element 3 arranged between the bead retainer means 1 and 2. The bead retainer means are axially slidable along a plurality, for instance four, slide bars 4 which are screwed fixedly onto an outer shaft 5 of a (not shown) housing 6 and carry the support element 3. At the end facing away from the housing the slide bars 4 are mutually connected by a support disc 7.

The outer shaft 5 and the support disc 7 have ball bearings 8 supporting a drivable main shaft 9. In the area of first bead retainer means 1 said main shaft has a left handed screw thread which cooperates with a screw box 10 which is also left handed and carrying the first bead retainer means, whereas in the area of the second bead retainer means 2 a right handed screw thread cooperates with a right handed screw box 11 carrying the second bead retainer means. When driving the main shaft 9 the bead retainer means 1 and 2 will therefore slide towards one another or move away from one another, for instance if the outer shaft 5 is slowed down. Because it has to be possible to introduce a pressurized medium in the clearance between the bead retainer means 1 and 2, said bead retainer means 1 and 2 are equipped at their facing sides with seals 12 engaging the main shaft 9. Also in the bead retainer means 1 and 2 seals 13 are provided which engage the slide bars 4. If the bead retainer means 1 and 2 move from the outwardly moved condition as shown in FIG. 1 to the inwardly moved condition as shown in FIG. 5, the rings 14, connected to the bead retainer means, will have to approach each other and when doing so shift a plurality of for instance six segments 15, still to be further elucidated, radially outwardly. For this purpose the rings 14 and the segment 15 are correspondingly bevelled at the facing surfaces. In FIG. 1 said bevelled condition is indicated by the angle α. Said angle is for instance approximately 45°.

As furthermore appears from FIG. 1, the two bead retainer means 1 and 2 are equipped with a disc 16 which encloses the elastic portions 17 or rings with a mushroom-shaped cross-section within the bead retainer means. In the clearance defined between the bead retainer means 1 and 2 and the discs 16 moreover an elastic bellows 18 is provided, and between said bellows 18 and the ring 17 a ring of filling-in pieces 19 is provided. Said filling-in pieces may consist of a plastic material and serve to press the elastic portion 17 in an air-tight manner against the reversed a mushroom-shaped end and the bead retainer means.

Because of the resilience of the rings 17 the filling-in pieces 19, which consist for instance of nylon, will not slide along each other.

Figure 2:
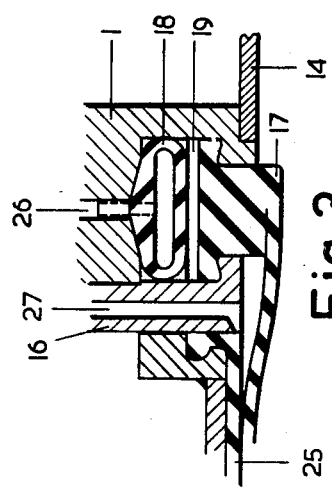
FIG. 2 shows in an enlarged scale a bead retainer means and a circumferentially radially expandable element in the non-expanded condition.
Figure 3:
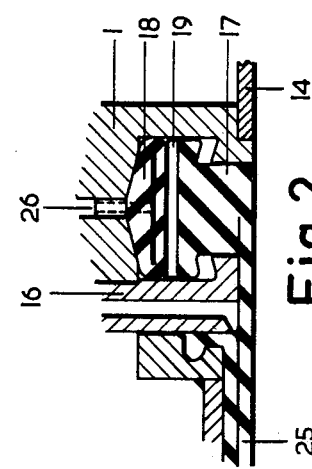
FIG. 3 shows the same as FIG. 2, but in the expanded condition.

The bellows 18 can be expanded by means of a pressure medium and are then displaced from the position indicated in FIG. 2 to the position indicated in FIG. 3. When making smaller tires, for instance scooter tires, the portions 17 and 18 could be combined and the filling-in pieces 19 can be left out.

Figure 4:
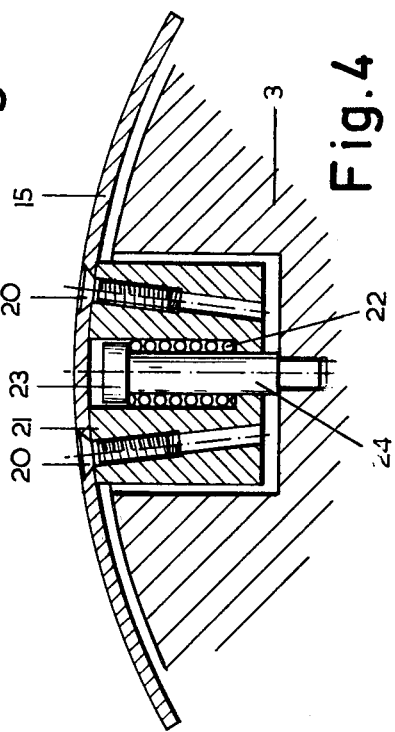
FIG. 4 shows in an enlarged scale a radial cross-section through the support element with a recess for the block with a segment screwed thereon.

On the basis of FIG. 4 the arrangement of the segments is further elucidated. The support element 3 has a plurality, for instance six, of segments 15 which are evenly spread along the circumference, only one segment thereof being shown in FIG. 4. By means of screws 20 the segment 15 is secured to a block 21, which can be biased in a recess of the support element 3 in a radially inward direction by means of at least one spring 22. Said spring 22 is located between a collar 23, a screw pin 24 and a basis of the bore which receives the spring 22. The spring is dimensioned such that developed centrifugal forces are overcome.

The operation of the drum as described is as follows. Firstly, when effecting a drum rotation in the condition of the drum as indicated in FIG. 1 a tire is laid on which consists of a layer of steel wire or cord web. Thus the drum forms a cylinder with a substantially smooth surface.

The bead cores 18 are now arranged above the elastic portions 17 by means of a positioning means which is known per se (not shown), and by the introduction of a pressure medium into the bellows 18 it is clamped onto the bead retainer means 1 and 2. After that a pressure medium is introduced into the pressure medium channels 27 of the discs 16, said medium being responsible for the fact that the carcass is evenly folded around the bead cores by the extensions 25. Then the introduction of pressure medium is effected into the clearance enclosed by the bead retainer means and the carcass layer while simultaneously moving the bead retainer means towards each other until they reach the position of FIG. 5. Finally a belt and a tread are applied to the rounded outer diameter of the carcass. The introduction of pressure medium is switched-off then and the drum is returned to its starting position, after which a new production cycle can start.

The axial extension 25 of the rings 17 can also be used to fold the cord layers in an already more or less rounded condition of the carcass. Not dependent on the selected operation manner, the extensions which are charged with pressure medium have to be axially pressed towards each other. This can be done by means of push devices, which are known per se, and which are not shown as they do not form a part of the invention.

With respect to the known drums with loose side bellow the drum according to the present invention shows the additional advantages, that there are no places where the carcass is not charged during the folding operation. Because of this the carcass layers are folded around the bead without pleats or air enclosures. Then as pressure medium air is preferred in the first place. The compressed air can be supplied to the drum via an air coupling 90. In order to complete the drum and to protect it against damages and pollution cover caps 29 are arranged.

What is claimed is:

1. A drum to build and form a belted tire, provided with a central support element, the central portion of which consists of radially slidable segments, and two bead retainer means arranged one at each side of said support element, the spacing of said bead retainer means being axially adjustable symmetrically with respect to the support element, the bead retainer means having at their circumference, radially expandable, integrally formed rings adapted to be brought into engagement with the tire in an air-tight manner, wherein the support element has an integrally formed rigid case between the central portion and the bead retainer means, the rigid case being fixedly connected to the side of the bead retainer means facing the central portion, the contact face of each rigid case facing the central portion being bevelled, the segments of the central portion which are arranged between the two cases engage the bevelled contact faces of the cases, are retained by means of springs and are similarly bevelled at the place of contact with the cases, whereby when the distance between the bead retainer means and the distance between the cases is decreased, the segments automatically extend radially outwardly and the cases slide underneath the segments and wherein the side of the ring facing the tire bead is cylindrical.

2. A drum according to claim 1, wherein the bevel of the respective contact faces has an angle of 45°.

3. A drum according to claim 1, wherein the central portion of the support elements consists of six segments secured to blocks and that the blocks are supported resiliently within a support flange.

4. A drum according to claim 3, wherein the springs are each arranged within a base of said block between the head of a stay bolt passing through the block and the base of the bore.

5. A drum according to claim 1, wherein the rings have a mushroom-shaped cross-section with the head of the mushroom radially inwardly placed, and retained within each bead retainer means by retainer flanges having annular spaces, closed by a disc.

6. A drum to build and form a belted tire comprising two bead retainer means, the axial spacing of which is adjustable, the two bead retainer means each having radially expandable elements at the circumference of the drum, said elements being adapted to be brought into an air-tight engagement with the tire bead, the space enclosed by the bead retainer means and a tire when on the drum, to which a device for the supply of a pressurized medium is connected, being closed in an air-tight manner, and wherein between the bead retainer means is provided a support element to which a driving mechanism is connected for the gradually axial adjustment of the spacing of bead retainer means, the radially expandable elements on the circumference being rings with a mushroom-shaped cross-section engaged in correspondingly formed annular groove closed by discs.

7. A drum according to claim 6, wherein the head portion of the mushroom-shaped cross-section at the inner diameter of the ring is planar and can be expanded by a bellows through the intermediary of a series of ring pieces.

8. A drum according to claim 6, wherein the rings are provided with an axial extension at the circumference of the drum, which is folded backwardly upon itself so that when a pressurized medium is introduced a radially expandable hollow annular space can be created for turning back the cord layers and/or mounting the flank parts of the belted tire.

9. A drum according to claim 6, wherein the bead retainer means are provided with facing rings, which are bevelled at their facing surfaces and are adapted to cooperate with radially displaceable segments disposed therebetween and also provided with bevelled surfaces.

* * * * *